United States Patent
Riou

Patent Number: 5,649,146
Date of Patent: Jul. 15, 1997

[54] MODULO ADDRESSING BUFFER

[75] Inventor: Marc Riou, Saint Egreve, France

[73] Assignee: SGS - Thomson Microelectronics S.A., Gentilly, France

[21] Appl. No.: 413,709

[22] Filed: Mar. 30, 1995

[30] Foreign Application Priority Data

Mar. 31, 1994 [FR] France ................... 94 03861

[51] Int. Cl.$^6$ .............................. G06F 9/26; G06F 12/00
[52] U.S. Cl. ................. 395/421.07; 395/421.09; 395/428; 395/401; 395/421.02
[58] Field of Search ................ 364/200; 395/421.1, 395/421.07, 421.02, 401, 428, 421.09

[56] References Cited

U.S. PATENT DOCUMENTS

| | | | |
|---|---|---|---|
| 4,202,035 | 5/1980 | Lane | 364/200 |
| 4,800,524 | 1/1989 | Roesgen | 364/900 |
| 5,448,706 | 9/1995 | Fleming et al. | 395/421.07 |

FOREIGN PATENT DOCUMENTS

| | | | |
|---|---|---|---|
| 0438991 | 7/1991 | European Pat. Off. | G06F 12/02 |
| 92-08186 | 5/1992 | WIPO | |
| 9208186 | 5/1992 | WIPO | |

*Primary Examiner*—David K. Moore
*Assistant Examiner*—Than V. Nguyen
*Attorney, Agent, or Firm*—Robert Groover; Betty Formby

[57] ABSTRACT

A circuit is provided for incrementing a current address of a circular buffer in an electronic memory by an increment to produce a next address including: an adder circuit for adding the current address to the increment and producing a first provisional next address; a circuit which causes the next address to be a base address plus an overshoot when the first provisional next address passes a limit address by a number equal to the overshoot, wherein for the calculation of the next address, there is provided an adder circuit including three adders receiving the current address, the increment and the limit address and producing a first and a second provisional next address and the difference between the first provisional next address and the limit address; and a selection circuit for selecting as the next address one of the two provisional next addresses, the selection being made upon the polarity of the difference between the first provisional next address and the limit address.

15 Claims, 3 Drawing Sheets

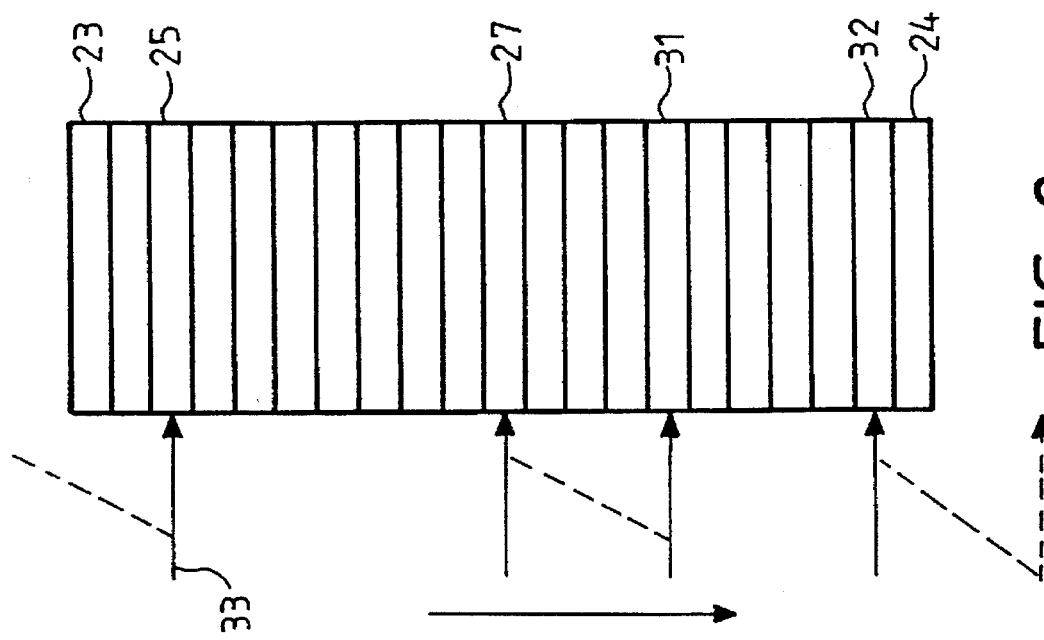
FIG_2
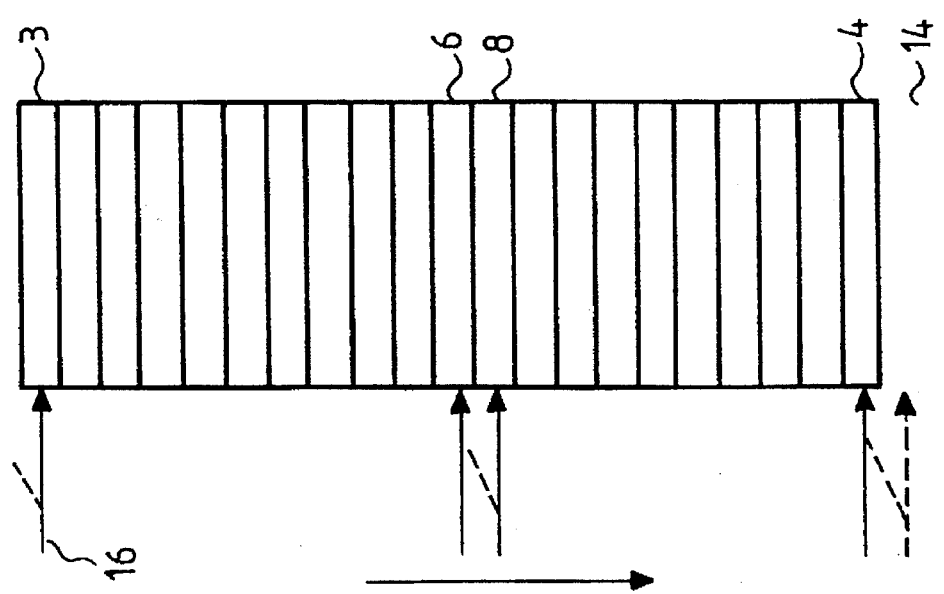
FIG_1

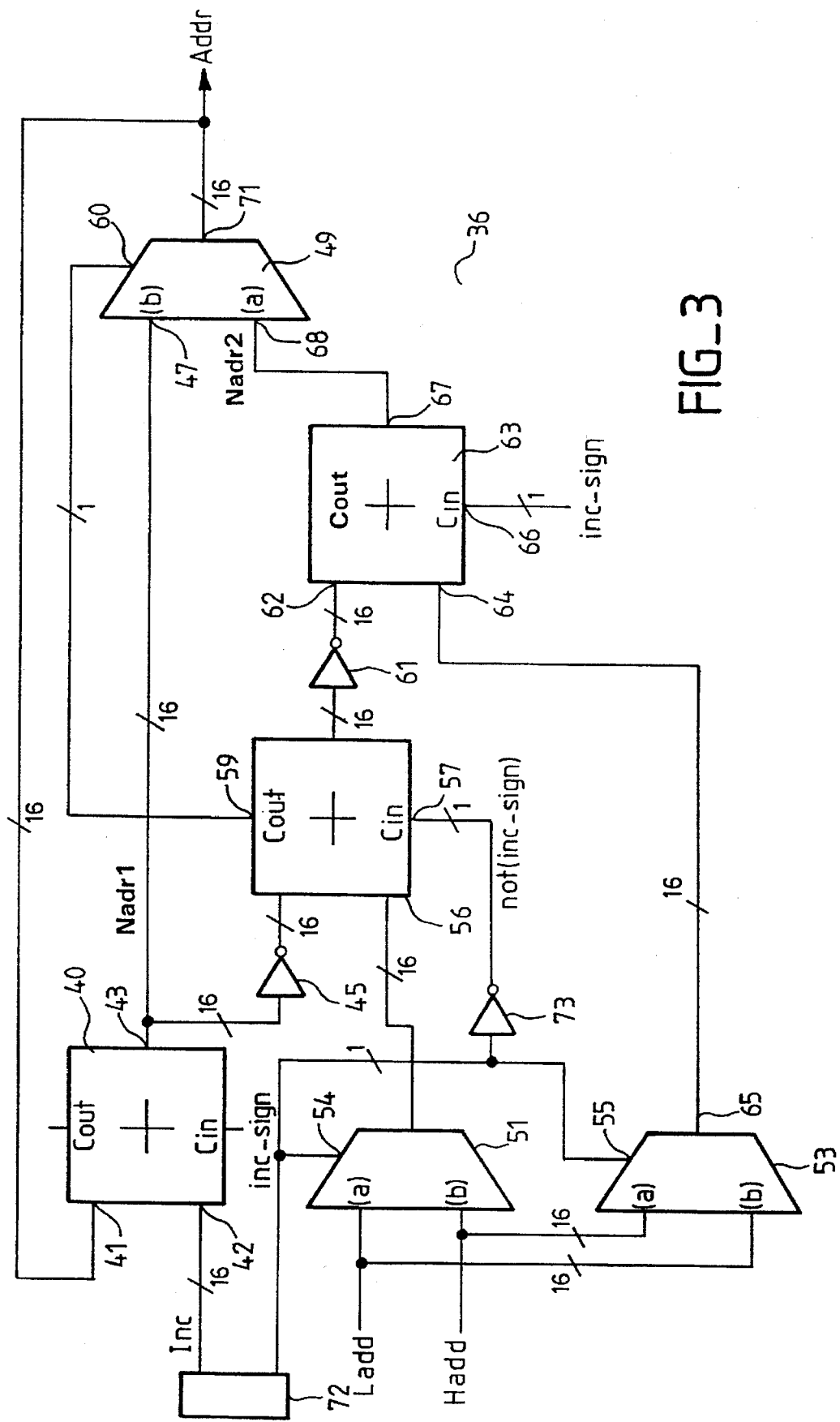
FIG_3

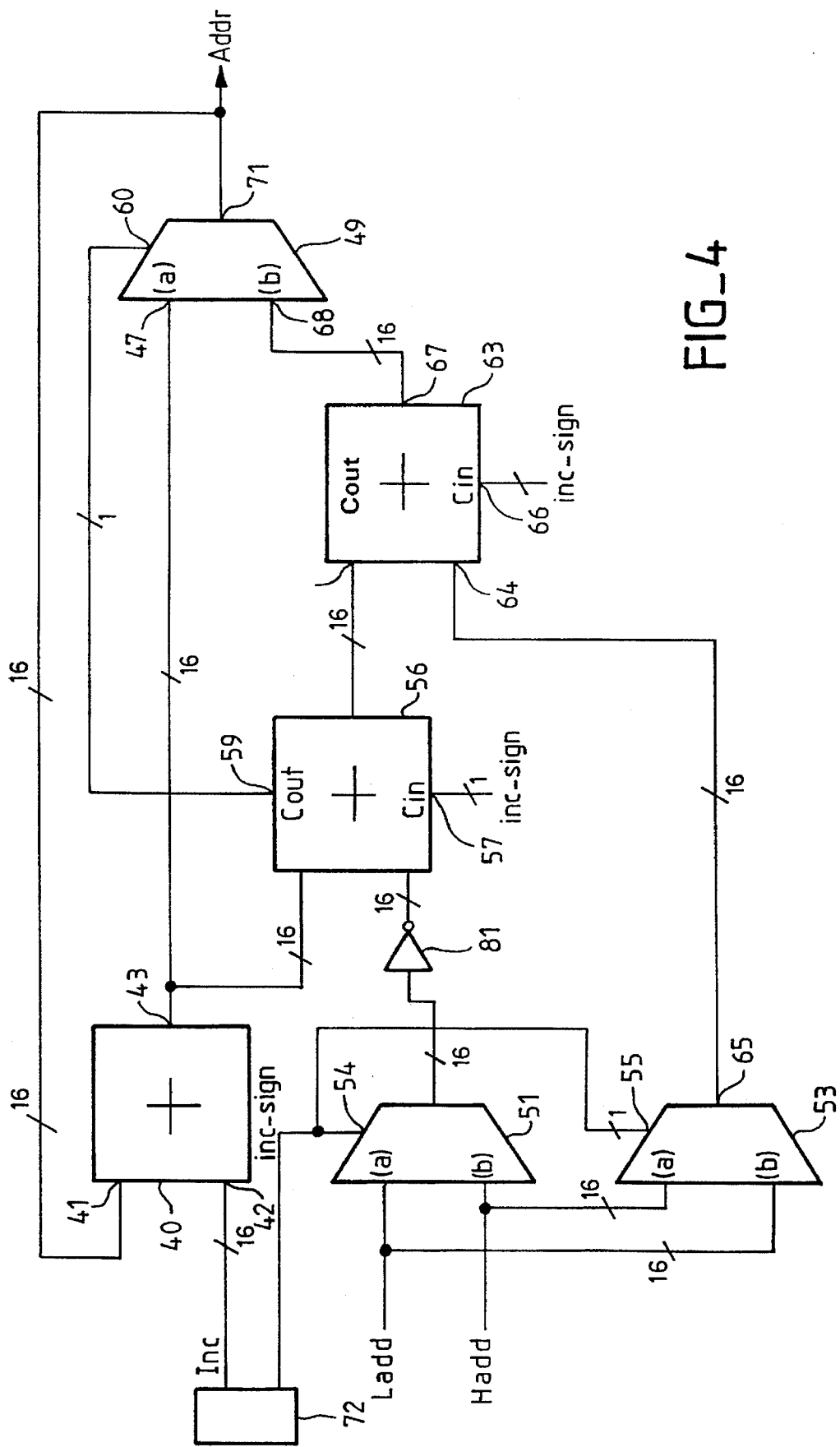
FIG_4

MODULO ADDRESSING BUFFER

CROSS REFERENCE TO RELATED APPLICATIONS

This application claims priority from French App'n 93-03861, filed Mar. 31, 1994.

BACKGROUND AND SUMMARY OF THE INVENTION

The present invention relates to addressing circuits used to control the access to memory locations within a memory device, more particularly to addressing circuits used to generate addresses for accessing circular buffers.

In many electronic circuits, there is a need to access, or address, certain periodically consecutive memory locations in a cyclic manner. This allows an unlimited number of read or write operations to be carried out in sequence, using only a small portion of the available memory. One memory location is addressed, then the next and so on until the end of a predefined memory area—the buffer—is reached. Addressing then returns to a location at the other end of the buffer. Typically, addressing begins at the lowest address available and increases until an upper limit is reached, and memory access is returned to the lowest available address in a wraparound step. Of course, the addressing could equally begin at the highest address available and decrease until a lower limit is reached, and memory access is returned to the highest available address in a wraparound step. This is known as circular, or modulo addressing, and the buffer is known as a circular or modulo addressed buffer.

The calculation of the addresses for use when accessing memory locations within such a circular buffer may be done in software installed on an associated microprocessor. These software techniques, however, require several operating cycles to complete a calculation and are too slow for certain applications, such as digital filtering, matrix manipulation and many other digital signal processing routines. Hardware addressing methods are therefore often preferred for their speed of operation. Such modulo addressing may be carried out in hardware by a circuit such as described in an international patent application number PCT/US91/08102, publication number WO 92/08186 from Analog Devices Inc.

FIG. 1 illustrates the typical organization of a simple circular buffer of the prior art. A series of memory locations are dedicated to the buffer. These locations have a lowest location 3 and a highest location 4. Other memory locations, for example 6, 8 are present at intermediary address locations. The address of memory location 14 just beyond the upper limit of the buffer, is used in the wraparound procedure. A control circuit controls the access to the memory locations of the buffer by generating and supplying an absolute current address of each memory location to a pointer register. The action of this control circuit is represented by a moving pointer 16.

Supposing the memory location 6 is being read, with pointer 16 pointing to this location. Once this is done, the address pointer 16 is incremented by one and memory location 8 is pointed at for reading or writing during the following cycle. This continues in an identical manner until the final memory location 4 in the buffer is read. The address supplied to the pointer 16 is incremented by one and becomes the address of memory location 14, in excess of the buffer's upper address limit. The control circuitry detects the presence of the address of location 14 in the register holding the pointer's input address, the control circuit resets the contents of this register and the memory location 3 with the lowest address is pointed to and accessed next. In this buffer, each location is accessed, one after the other, in sequence. Reaching the end of the buffer is detected by the control circuitry when address of the memory location 14 just beyond the upper limit of the buffer is supplied to the pointer.

The control circuitry of such a buffer may be arranged such that a register is loaded with (M-1), where M is the number of locations in the buffer, and the contents of this register are decremented at each read or write cycle, and when the contents of the register reach 0, the register is reset to contain (M-1). The contents of the register are added to the address of the lowest location within the buffer. There are no limitations on the size of the buffer, nor the start address of the buffer. They may be of any size. This buffer will not work if the address is incremented in steps of two or more memory locations, as the memory location 14 may be skipped.

FIG. 2 illustrates another circular buffer of the prior art. A plurality of memory locations are included within the buffer. The buffer has a lowest addressed location 23 and a highest addressed location 24. Memory locations 25, 27, 31, 32 lie between these two limits. A control circuit controls the access to the memory locations of the buffer by generating and supplying the absolute address of each memory location. This is represented by a moving pointer 33.

This buffer allows memory accesses with steps greater than one location to be used. The buffer must contain a number of memory locations which is an integral power of 2. If the buffer contains 2 n locations, the lowest address 23 of the buffer must have all of its n least significant bits equal to 0. The highest address of the buffer will then have all of its n lowest bits equal to 1. Taking as an example the case where n=8, the buffer will have 28=256 locations. The pointer is currently pointing to location 27, which may have the 12 bit address 110010101000. Let us suppose that the buffer control circuitry is incrementing the addresses in steps of four. The next location pointed to will be location 31, with address 110010101100. This will continue until the end of the buffer is almost reached. After addressing location 32, with—for example—an address 110011111110, the address is incremented by four to 110100000010. This lies outside the buffer, and is detected by the control circuitry by the change in bit 8. Bit 8 is then reset to 0 and the new address is 110000000010, location 25, near the lowest address end of the buffer. The control circuitry for this buffer is much more complex than that required for the buffer of FIG. 1. The simplest circuitry is obtained when the buffer is used according to all of the above-mentioned restrictions; that is that the buffer must be of length 2 n, and must start at a location whose address is an integer multiple of 2 n, in order to have its n least significant bits equal to 0.

By using extra circuitry, it is possible to provide a circular buffer of lengths other than powers of two. For example, a 120 location circular buffer may be provided by detecting a change in the 8th bit of the output of an adder connected to add 8 to the pointer address.

There is also a requirement to be able to decrement the accessed address by any number of locations, and to have the buffer any length, not necessarily a multiple of 2 n.

The required operation of a circular buffer is to detect the passing of the upper address limit, and return the pointer to the correct number of locations above the lower address limit, being equal to the length of the overshoot beyond the upper limit address, in the case of positive increments.

Using the symbols Addr for the current address, Nadr for the next address, Inc for the increment, Ladd for the lower address limit and Hadd for the upper address limit, the next address Nadr will be:

*Addr+Inc,* unless this is greater than Hadd, in which case, the next address needs to be:

*Nadr=Addr+Inc−Hadd+Ladd−1.*

For example, for a buffer with upper address limit 120, lower address limit 10, a current address of 117 and an increment of +4,

*Nadr=117+4−120+10−1=10.*

Conversely, when a negative increment is used, the required operation of a circular buffer is to detect the passing of the lower address limit, and return the pointer to the correct number of locations below the upper address limit, being equal to the length of the overshoot below the lower address limit, in the case of negative increments.

Using the same symbols and the same example, but with a decrement of 4, the next address will be:

*Addr+Inc,* as Inc is a signed integer, unless this is less than the lower address limit, in which case the next address will be:

*Nadr=Addr+Inc+Hadd−Ladd+1.*

Supposing the current address is 12, the next address will be:

*Nadr=12−4+120−10+1=119.*

The above referenced patent application attempts to solve a problem resulting from the limitations imposed by the above described buffers by providing four registers of N bits, which hold: a first boundary address in the buffer; the next address to be accessed; the increment value and the length of the buffer. Either the first boundary address register or the length register may be replaced by a register which contains a second boundary address of the register. Incrementation and address wraparound is performed in such a way that the buffer may be of any length and located at any position in memory. The contents of the increment register are added to the contents of the current address register, and if this sum exceeds the limit of the buffer, an alternative address is selected, being the alternative described above. However, this circuit suffers from certain problems.

Firstly, the circuit is rather complicated, involving the use of at least four different circuit blocks, namely a multiplexer, an adder, an adder/subtractor and a comparator. This makes it difficult to optimize the circuit to obtain optimum performance from any given manufacturing process, as each block must be individually optimized, and then the effects of one block on the others connected to it must be considered. Thus the circuit is likely to operate at a non-optimum speed, and any change in manufacturing process would require a considerable optimization effort. Secondly, the circuit makes the decision as to which of the two possible next addresses are to be used right at the end of the processing. Two addresses are calculated, then the first provisional next address is compared to a fixed limit address or buffer length to determine which provisional next address is to be used. The use of a multiple bit comparator introduces delays due to the complexity of such a circuit block, and its inclusion into the critical path of calculation of the next address means that an additional delay is introduced after both provisional next addresses have been calculated.

The object of the current invention is to provide a simple, fast hardware circular buffer addressing circuit which allows modulo addressing of a buffer of any size, located at any address in the memory, and within which the pointer may be incremented or decremented at each addressing operation by any amount up to the size of the buffer. Furthermore, the invention seeks to provide such a circuit with a reduced critical path to ensure fastest possible operation, simple circuitry to facilitate optimization of operation and ease of adaptation to manufacturing processes. The invention also seeks to provide a circuit which is easily scaleable for any size of buffer, and any length of addressing used.

More particularly, in accordance with the invention, a circuit is described for incrementing a current access address of a circular buffer in an electronic memory by an increment to produce a next address. This circuit includes an adder circuit for adding the current address to the increment and producing a first provisional next address and a circuit which causes the next address to return to a base address plus an overshoot, when the incremented address passes a limit address by a number equal to the overshoot. For the calculation of the next address, there is provided an adder circuit including only three adders receiving the current address, the increment and the limit address and producing a first and a second provisional next address and the difference between the first provisional next address and the limit address; and a selection circuit for selecting as the next address one of the two provisional next addresses, the selection being made upon the polarity of the difference between the first provisional next address and the limit address.

The increment may be of either positive or negative polarity, which may be selected while the circuit is in operation. Equally, the magnitude of the increment and the limit addresses of the buffer may be selected while the circuit is in operation.

Such a circuit may have a first adder which adds the current address and the increment to produce a first provisional next address and a second adder which adds or subtracts, depending on the polarity of the increment, the first provisional next address and the limit address to produce the difference value and a signal indicating the passing of the limit address by the first provisional address; and a third adder which adds or subtracts, depending on the polarity of the increment, the difference value and the base address to produce a second provisional next address.

The second and third adders may receive a signal on a carry input indicating the polarity of the increment.

In alternative preferred embodiments, either: one of the inputs of each of the second and third adders is connected to the output of a first and a second inverter, respectively; or one of the inputs of the second adder is connected to the output of a third inverter.

In particular, the circuit may comprise: a first two-input adder whose output is connected to an input of a first two-input multiplexer and further connected to a first input of a second two-input adder; the output of the second two-input adder being connected to a first input of a third two-input adder; the output of the third two-input adder being connected to a second input of the first multiplexer; the output of the first multiplexer being connected to a first input of the first two-input adder; further comprising a connection between a carry out output of the second two-input adder and a control terminal of the first multiplexer.

The circuit may further include second and third multiplexers whose outputs are connected to second inputs of the second and third adders respectively and whose first, second and control inputs are respectively connected together.

In the alternative preferred embodiments, either a first inverter is included between the output of the first adder and the first input of the second adder and a second inverter is included between the output of the second adder and the first input of the third adder; or a third inverter is connected between the output of the second multiplexer and the second input of the second adder.

The circuit will preferably further include a connection between the control input of the second multiplexer and a carry in input of the third adder in the first embodiment; and a connection between the control input of the second multiplexer and carry in inputs of the second and the third adders in the second embodiment.

The objects of the current invention may be achieved as described below in reference to specific embodiments, with reference to FIGS. 3 and 4 of the accompanying drawings wherein:

BRIEF DESCRIPTION OF THE DRAWING

FIG. 1, already depicted, represents schematically, a circular buffer of the prior art;

FIG. 2, already depicted, represents schematically, another circular buffer of the prior art;

FIG. 3 is a circuit diagram of an embodiment of a circular buffer control circuit according to the current invention;

FIG. 4 is a circuit diagram of another embodiment of a circular buffer control circuit according to the current invention;

DETAILED DESCRIPTION

FIG. 3 shows an incrementing circuit 36 according to a first embodiment of the invention, which can control the incrementing of a current address of a circular buffer in an electronic memory by an increment to produce a next address. The circuit includes: an adder circuit for adding the current address Addr to the increment Inc and producing a first provisional next address Nadr1; a circuit which causes the next address to return to a base address Ladd/Hadd plus an overshoot when the incremented address passes a limit address Hadd/Ladd by a number equal to the overshoot. In the circuit 36, for the calculation of the next address, there is provided an adder circuit including three adders 40, 56, 63 receiving the current address Addr, the increment Inc and the limit address Hadd/Ladd and producing a first and a second provisional next address Nadr1, Nadr2 and the difference between the first provisional next address and the limit address, the incrementing circuit including a selection circuit for selecting as the next address one of the two provisional next addresses, the selection being made upon the polarity of the difference between the first provisional next address and the limit address. Most of the circuitry operates on multiple line data busses. In the current example, a 16-bit address length is assumed. The address length could, however, be of any desired number of bits.

A first adder 40 has two inputs 41, 42 and an output 43. The output 43 of this adder is connected to an input of a first inverter 45 and to a (b) input 47 of a first two input multiplexer 49. A second two input multiplexer 51 receives the highest Hadd and lowest Ladd addresses of the buffer on its (b) and (a) inputs, respectively. A third two input multiplexer 53 receives the lowest Ladd and highest Hadd addresses of the buffer on its (b) and (a) inputs, respectively. The select inputs 54, 55 of the second and third multiplexers are connected together and receive a signal inc-sign. The output of the first inverter 45 is connected to the first input of a two input adder 56. The output of the second multiplexer 51 is connected to the second input of the adder 56 whose carry in input 57 is connected to inverter 73 to receive the inverse of signal inc-sign, and whose carry output 59 is connected to a select input 60 of the first multiplexer 49. The output of adder 56 is connected to an input of a second inverter 61, whose output is connected to the first input 62 of a second two-input adder 63. This adder 63 has a second input 64 which is connected to the output 65 of the third multiplexer 53, a carry in input 66 which receives the inc-sign signal, and an output 67 which is connected to the (a) input 68 of the first multiplexer 49. The output 71 of the first multiplexer 49 is the output of the circuit, and is also connected to the first input 41 of the first adder 40. The INC and inc-sign signals are supplied by a circuit 72 which allows the polarity inc-sign and the magnitude of the increment Inc to be changed during the operation of the circuit.

Each of the adders, multiplexers and inverters are composed of a number, in this case 16, of identical 1-bit circuits, suitably interconnected.

The multiplexers 49, 51, 53 transfer the data on their (b) input to their output when the respective select inputs are held LOW, and transfer the data on their (a) input to their output when the respective select inputs are held HIGH.

The signal inc-sign indicates whether incrementing or decrementing of the current address is required. It is LOW for a positive increment and HIGH for a negative increment (decrement).

Taking the example where positive incrementing is being carried out, the inc-sign signal will be LOW. This signal, applied to the select inputs of the second and third multiplexers 51, 53, causes the data on the (b) inputs of each multiplexer to be transferred to the respective output. The maximum buffer address Hadd is thus supplied to the second input of adder 56, and the minimum buffer address Ladd to the second input 64 of adder 63. The signed integer Inc representing the required step size between the current address Addr and the next address Nadr is supplied by a separating circuit 72, respectively to the second input 42 of the first adder 40 and to a select input of multiplexers 51 and 53. The circuit 72 separates in the Inc signal its absolute value from its sign. The current address Addr is supplied to the first input 41. The output 43 will then supply a first provisional next address Nadr1, being the current address Addr plus the increment Inc, to the (b) input 47 of first multiplexer 49. Thus, $$Nadr1 = Addr + Inc.$$

The second adder 56 receives the inverse of the first provisional next address not(Nadr1) from first inverter 45 on its first input, and the maximum address for the buffer Hadd on its second input. The carry in input 57 of the second adder 56 is held HIGH by the not(inc-sign) signal provided by an inverter so a carry bit is added to the output. Adding these is the equivalent of subtracting the first provisional next address Nadr1 from the maximum buffer address Hadd:

$$\begin{aligned} \text{not(Nadr1)} + \text{Hadd} + 1 &= (-\text{Nadr1} - 1) + 1 + \text{Hadd} \\ &= \text{Hadd} - \text{Nadr1} - 1 + 1 \\ &= \text{Hadd} - \text{Nadr1} \quad - [1] \end{aligned}$$

(In binary arithmetic with a fixed bit count, $\text{not}(x)+1 = -x$.)

The output [1] of this second adder 56 is supplied to the second inverter 61 and then the inverted output of the second adder is supplied to the first input 62 of the third adder 63, whose second input 64 receives the lowest address of the buffer Ladd. These are added, with no carry bit, as its carry in input 66 receives the LOW inc-sign signal and the result is the second provisional next address, Nadr2, which is supplied to the (a) input of the multiplexer 49. The result of this addition is thus:

$$Nadr2 = not(Hadd-Nadr1)+Ladd;$$

$$Nadr2 = -(Hadd-Nadr1)-1+Ladd;$$

$$Nadr2 = -Hadd+Nadr1-1+Ladd;$$

$$Nadr2 = Nadr1-Hadd+Ladd-1;$$

$$Nadr2 = Addr+Inc-Hadd+Ladd-1.$$

Both possible next addresses are now provided. The first provisional next address Nadr1 should be used when the increment may be made without exceeding the higher address limit for the buffer, the second provisional next address being used when the increment does cause the first provisional next address to exceed the upper address limit for the buffer.

The choice of which provisional next address to use is made by the select input 60 of the first multiplexer 49. It receives a signal from the carry out output 59 of the second adder 56. If the first provisional next address Nadr1 is lower than the maximum buffer address Hadd, this carry output will be low. This will cause the first multiplexer 49 to provide the data on its (b) input, being the first provisional next address Nadr1 on its output 71, both to the pointer and to the first adder 40. However, if the first provisional next address Nadr1 is greater than the maximum buffer address Hadd, the carry out output 59 will be HIGH, as a negative number will have resulted from the addition. This will cause the first multiplexer 49 to supply the data on its (a) input, being the second provisional next address Nadr2, on its output to the pointer and the first adder 40.

Thus the requirement is met, whereby the address returns to the lower limiting address plus the overshoot as soon as the next address to the pointer exceeds the upper limit Hadd.

Similarly, for the case when negative increments are being used, the inc-sign signal will be HIGH. This signal, applied to the select inputs of the second and third multiplexers 51, 53, causes the data on the (a) inputs of each multiplexer to be transferred to the respective output. The minimum buffer address Ladd is thus supplied to the second input of adder 56, and the maximum buffer address Hadd to the second input 64 of adder 63. The signed integer Inc representing the required step size between the current address Addr and the next address Nadr is supplied to the second input 42 of the first adder 40. The current address Addr is supplied to the first input 41. The output 43 will then supply a first Provisional next address Nadr1, being the current address Addr plus the increment Inc, to the (b) input 47 of first multiplexer 49. Thus, $$Nadr1 = Addr+Inc.$$

The second adder 56 receives the inverse of the first provisional next address not(Nadr1) from first inverter 45 on its first input, and the minimum address for the buffer Ladd on its second input. The carry in input 57 of the second adder 56 is held LOW by the not(inc-sign) signal, so no carry bit is added to the output. Adding these is the equivalent of subtracting the first provisional next address Nadr1 from the minimum buffer address Ladd, minus 1:

$$not(Nadr1) + Ladd = (-Nadr1 - 1) + Ladd;$$
$$= Ladd - Nadr1 - 1.$$

The output of this second adder 56 is supplied to the second inverter 61 and the output of the second inverter is supplied to the first input 62 of the third adder 63, whose second input 64 receives the highest address of the buffer Hadd. These are added, with a carry bit due to the HIGH inc-sign signal applied to the carry in input 66, and the result is the second provisional next address, Nadr2, which is supplied to the (a) input of the multiplexer 49. The result of this addition is thus:

$$Nadr2 = not(Ladd-Nadr1-1)+Hadd+1;$$

$$Nadr2 = -Ladd+Nadr1+1-1+Hadd+1;$$

$$Nadr2 = Nadr1-Ladd+Hadd+1;$$

$$Nadr2 = Addr+Inc+Hadd-Ladd+1.$$

Both possible next addresses are now provided. The first provisional next address Nadr1 should be used when the decrement may be made without exceeding the lower address limit for the buffer, the second provisional next address being used when the decrement does cause the first provisional next address to exceed the lower address limit for the buffer.

The choice of which provisional next address to use is made by the select input 60 of the first multiplexer 49. It receives a signal from the carry out output 59 from the second adder 56. If the first provisional next address Nadr1 is higher than the lower address limit Ladd, this carry output will be low. This will cause the first multiplexer 49 to provide the first provisional next address Nadr1, applied to its (b) input, on its output both to the pointer and to the first adder 40. However, if the first provisional next address Nadr1 is lower than the lower address limit Ladd, the carry output, 59 will be HIGH, as a negative number will have resulted from the addition. This will cause the first multiplexer 49 to supply the second provisional next address Nadr2, applied to its (a) input to the pointer and the first adder 40.

Thus the requirement is met, whereby the address returns to the upper address limit minus the overshoot as soon as the next address to the pointer is lower than the lower limit Ladd.

In this embodiment, the speed of operation may be limited by the critical path timing. The critical path is the path of data flow which is the last to produce a result required for the provision of the next address to the pointer. In the case of the circuit of FIG. 3, the critical path passes from the first adder 40 to the first inverter 45 to the second adder 56 to the second inverter 61 to the third adder 63 and the first multiplexer 49.

By reconsidering the derivation of the output of the third adder 63, a simplified circuit with a reduced critical path may be obtained. The output of the third adder 63, in the case of positive incrementing, is required to be:

$$Nadr2 = Nadr1-Hadd+Ladd-1$$

which gives:

$$Nadr2 = Nadr1+not(Hadd)+Ladd.$$

In the case of negative incrementing, this output is required to be:

$$Nadr2 = Nadr1 - Ladd + Hadd + 1$$

which gives:

$$Nadr2 = Nadr1 + Hadd + not(Ladd) + 2.$$

FIG. 4 shows circuitry representing these equations, including an alternative circuit for the derivation of the second provisional next address, Nadr2. This circuit is substantially identical to that of FIG. 3, and identical features have identical identification labels. The first and second inverters 45, 61 are removed, a third inverter 81 is inserted between the output of the second multiplexer 51 and the second input of the second adder 56. The carry in inputs 57, 66 of both the second and third adders 56, 63 respectively are both connected to the inc-sign signal. The (a) and (b) inputs to the first multiplexer 49 are reversed.

Taking the case when a positive increment is being used, and inc-sign is LOW, the second adder 56 adds the first provisional next address Nadr1 from the output 43 of the first adder 40 to the inverse of the highest buffer address not(Hadd), with the LOW inc-sign signal to the carry in input causing no carry bit to be added. The output of this second adder is thus:

$$Nadr1 + not(Hadd);$$

$$Nadr1 - Hadd - 1.$$

The third adder 63 adds the result of this addition to the lowest buffer address Ladd. The LOW inc-sign signal on the carry in input causes no carry bit to be added, and the output of the third adder 63 is thus:

$$Nadr2 = (Nadr1 - Hadd - 1) + Ladd;$$

$$Nadr2 = Nadr1 - Hadd + Ladd - 1,$$

identically to the result of the circuit of FIG. 3.

In the case when a negative increment is being used, and inc-sign is HIGH, the second adder 56 adds the first provisional next address Nadr1 from the output 43 of the first adder 40 to the inverse of the lowest buffer address not (Ladd), with the HIGH inc-sign signal to the carry in input adding one to the output. The output of this second adder is thus:

$$Nadr1 + not(Ladd) + 1;$$

$$Nadr1 - Ladd.$$

The third adder 63 adds the result of this addition to the highest buffer address Hadd. The HIGH inc-sign signal on the carry in input causes one carry bit to be added, and the output of the third adder 63 is thus:

$$Nadr2 = (Nadr1 - Ladd) + Hadd + 1;$$

$$Nadr2 = Nadr1 - Ladd + Hadd + 1,$$

identically to the result of the circuit of FIG. 3.

However, in this case, the operation of the first multiplexer is changed. if the first provisional address does not pass the upper address limit Hadd, the result of the addition performed by the second inverter is negative, producing a high carry out signal 59 to the control input of the multiplexer 49. If the first provisional address exceeds the upper address limit, the result of the addition is positive, the carry out output 59 is low. This is the opposite of the situation described with reference to FIG. 3. For this reason, the inputs to the third inverter 49 are inverted: the first provisional next address Nadr1 is applied to the (a) input, and the second provisional next address Nadr2 is applied to the (b) input.

In this circuit, one inverter less is required, and the critical path length is reduced. The input and output of inverter 81 are substantially constant, changing only when the direction of incrementing changes, indicated by a change of sign on the inc-sign signal, or in the case when one of the limit addresses Ladd, Hadd is changed during circuit operation. The critical path is shortened by two inverter delays. This is an important time saving, as the use of hardware buffer address generators is primarily to provide an increase in operating speed over software implementations.

The invention thus fulfils its objectives of providing a simple, fast hardware addressing circuit for a circular buffer without imposing any limitation on the starting or finishing addresses, the size of the buffer or the size or polarity of the increments between successive accesses. All the parameters in use—the lower and upper limit addresses, the size and polarity of the increment—may be changed at will during operation of the circuit. The speed of operation is optimized by use of simple circuit blocks, the removal of the inverters from the critical path, the decision on which of the two provisional next addresses is to be used being made before the second provisional next address is calculated, and the configuration for a positive or a negative increment being made by the second and third multiplexers, again outside of the critical path. The circuit uses only two different circuit blocks—a two-input adder and a two-input multiplexer, plus a set of inverters. This makes circuit optimization easy, as only two simple blocks need to be optimized, allowing fastest possible operation to be achieved, and facilitating adaptation of the circuit to changes in its manufacturing process. Expansion or reduction of the circuit to cope with any length of addressing is simple, by adding or removing elemental, 1-bit adders, multiplexers and inverters in parallel.

While the current invention has been described with reference to two specific embodiments, many other embodiments will be apparent to those skilled in the art, for example the use of address lengths other than 16, omission of the second and third multiplexers when only one of positive and negative incrementing is required; and the inclusion of further multiplexers to enable the circuit to control two or more circular buffers.

What is claimed is:

1. A circuit for incrementing a current address of a circular buffer in an electronic memory by an increment to produce a next address including:

an adder circuit for adding said current address to said increment and producing a first provisional next address;

a circuit which causes said next address to be a base address plus an overshoot when said first provisional next address passes a limit address by a number equal to said overshoot, wherein said adder circuit includes first, second and third adders, said first adder adds said current address, and said increment to produce said first provisional next address, said second adder adds or subtracts, depending on the polarity of said increment, said first provisional next address and said limit address and produces a difference value and a signal indicating the passing of said limit address by said first provisional next address, said third adder adds or subtracts, depending on the polarity of said increment, said difference value and said base addresses to produce a second provisional next address;

a selection circuit for selecting as said next address one of said first or second provisional next addresses, the selection being made upon the polarity of the difference between said first provisional next address and said limit address.

2. A circuit according to claim 1 wherein means are provided for selection of the polarity and the magnitude of said increment, and said limit addresses while the circuit is in operation.

3. A circuit according to claim 1 characterised in that said second and third adders receive a signal on a carry input indicating the polarity of the increment.

4. A circuit according to claim 1 characterised in that one of the inputs of said second adder is connected to the output of an inverter.

5. A circuit according to claim 1 characterised in that one of the inputs of each of said second and third adders is connected to the output of a first and a second inverter, respectively.

6. A circuit for providing modulo N values comprising:

a first two-input adder whose output is connected to an input of a first two-input multiplexer and further connected to an input of a second two-input adder;

the output of the second two-input adder is connected to an input of a third two-input adder;

the output of the third two-input adder provides said modulo N values and is connected to a second input of the first multiplexer;

the output of the first multiplexer is connected to a first input of the first two-input adder;

further comprising a connection between a carry out output of the second two-input adder and a control terminal of the first multiplexer.

7. A circuit according to claim 6 wherein an inverter is included between the output of the first adder and the first input of the second adder and a second inverter is included between the output of the second adder and the first input of the third adder.

8. A circuit according to claim 6 which further includes second and third multiplexers whose outputs are connected to second inputs of the second and third adders and whose first, second and control inputs are respectively connected together.

9. A circuit according to claim 8 which further includes a third inverter connected between the output of the second multiplexer and the second input of the second adder.

10. A circuit according to claim 9 which further includes a connection between the control input of the second multiplexer and a carry in input of the third adder.

11. A circuit according to claim 8 when dependant on claim 8 which further includes a connection between the control input of the second multiplexer and carry in inputs of the second and the third adders.

12. A circuit for generating modulo addresses, comprising:

an output multiplexer connected to provide an output address;

a first digital adder, operatively connected to receive an increment data value and said output address as inputs thereto, and to provide a first candidate value as a corresponding output;

second and third multiplexers, each connected to receive high and low address boundary values and to provide a selected one thereof as outputs in dependence on the state of an increment-polarity signal, said multiplexers being connected to provide different ones of said boundary values on said respective outputs thereof to respective first inputs of second and third adder circuits;

said second adder being connected to find the difference between a selected boundary value and said first candidate value, and to provide a difference output and a carry output signal accordingly;

said third adder being operatively connected to find the difference between its respective first input and said difference output of said second adder, and to provide a respective difference output accordingly;

said output multiplexer being operatively connected to receive said first candidate value and said difference output of said third adder as said first and second inputs thereto, and connected to receive said carry output signal of said second adder as a select signal, and to provide said address signal accordingly;

whereby said output multiplexer generates said output address value corresponding to the previous address value incremented by said increment data value in a direction to be given by said increment-polarity input, and corrects said address output whenever said address output exceeds said high address boundary value or falls below said low address boundary value.

13. The circuit of claim 12 wherein one of the inputs of said second adder is connected to the output of an inverter.

14. The circuit of claim 12, wherein one of the inputs of each of said second and third adders is connected to the output of a first and a second inverter, respectively.

15. The circuitry of claim 12, wherein said increment data value and said high and low address boundary values may be dynamically changed.

* * * * *